April 25, 1961

H. E. RIORDAN ET AL 2,981,187

PNEUMATIC MECHANISM FOR BOOSTER CLAMP RING RELEASE

Filed Nov. 10, 1958

HUGH E. RIORDAN
SERGE N. SAMBUROFF
JOHN E. BAUGHMAN
INVENTORS

BY G. D. O'Brien
Q. Barton Warner
ATTORNEYS

April 25, 1961 H. E. RIORDAN ET AL 2,981,187
PNEUMATIC MECHANISM FOR BOOSTER CLAMP RING RELEASE
Filed Nov. 10, 1958 3 Sheets-Sheet 3
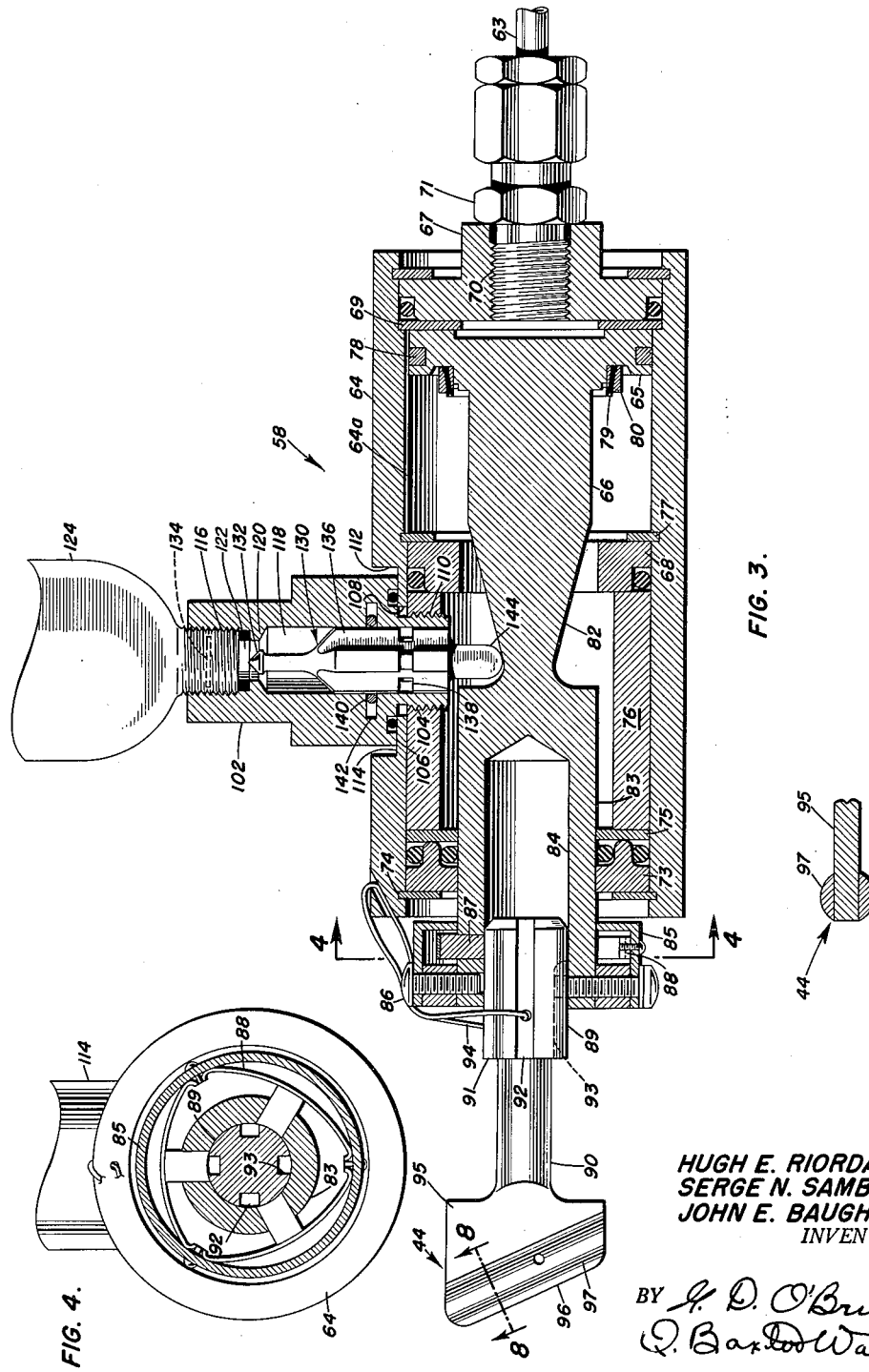
HUGH E. RIORDAN
SERGE N. SAMBUROFF
JOHN E. BAUGHMAN
INVENTORS
BY *J. D. O'Brien*
*D. Baxter Warner*
ATTORNEYS

United States Patent Office 2,981,187
Patented Apr. 25, 1961

2,981,187
PNEUMATIC MECHANISM FOR BOOSTER CLAMP RING RELEASE

Hugh E. Riordan and Serge N. Samburoff, Silver Spring, and John E. Baughman, West Hyattsville, Md., assignors to the United States of America as represented by the Secretary of the Navy Filed Nov. 10, 1958, Ser. No. 773,119

8 Claims. (Cl. 102—49)

This invention relates to a pneumatic release mechanism, and more particularly to a pneumatically operated device for effecting in-flight release of a clamping ring connecting a booster to a missile.

Results of flight tests of missile-booster combinations indicate that one cause of flight failure can possibly be attributed to unsatisfactory separation of the missile and the booster. It is theorized that a slow booster tail-off time combined with pressure oscillations in the missile diffuser will permit such damaging recontact between the missile and the booster as to result in flight failure. Test results also indicate the presence of certain lateral forces particularly at separation which tend to produce unstable flight. As one approach to the problem of eliminating these destabilizing forces, a locked joint is provided between the missile and the booster and is released at such an instant as to guarantee rapid separation in order that any destabilizing forces will have less time within which to act. As described in a pending application for U.S. Letters Patent by R. S. Brashears relating to a Clamping Ring Release Mechanism, Serial No. 721,072, filed March 12, 1958, the locked joint is obtained by utilizing a clamping ring that is released at a time slightly later than that at which separation would normally occur. This delay in release time creates a tension force across the joint as a result of the decay of booster thrust below the drag differential between the missile and the booster to insure rapid separation when the clamping ring is released. It is seen then, that a device is required which will sense the proper time for release of the clamping ring and then effect release of the clamping ring in such manner as to insure timely and rapid release.

It is, therefore an object of this invention to provide means for effecting, at a time most favorable for rapid separation, in-flight release of a clamping ring coupling a missile to a booster.

It is also an object of this invention to provide means for effecting, as rapidly as possible, in-flight release of a clamping ring coupling a missile to a booster in order to mitigate the effects of any destabilizing forces imposed by the booster on the missile.

Other objects and many of the attendant advantages of this invention will readily be appreciated as the same becomes understood by reference to the following detailed description when considered in connection with the following drawings, wherein:

Fig. 3 is a longitudinal section of the sensing and actuating cylinder of the release mechanism;

Fig. 4 is a cross section on line 4—4 of Fig. 3 showing details of the clutching arrangement in the sensing and actuating assembly;

Fig. 5 is an enlarged fragmentary view of Fig. 2 showing, partly in section, details of the hammer and sear arrangement of the clamping ring;

Fig. 6 is a plan view of the hammer and sear arrangement shown in Fig. 5;

Fig. 7 is a cross section on line 7—7 of Fig. 5; and

Fig. 8 is a cross section on line 8—8 of Fig. 3.

Briefly, the present invention contemplates a keeper engageable with and restraining release of a clamping ring that couples a booster to a missile. A sensing and actuating cylinder is mounted on the booster and includes a differential piston engageable with the keeper in locked relationship. The piston first responds to transmitted booster pressure acting on a first effective area and is moved in a sensing stroke that causes engagement of the piston and keeper in locked relationship. Simultaneously, the sensing stroke causes a source of high pressure gas to be released into the cylinder on the opposite side of the piston, the gas acting on a second and smaller effective area that is in establishment only at the end of the sensing stroke. During the main portion of the boost phase, the value of the booster pressure is adequate to maintain the piston at the end of the sensing stroke. However, as the booster pressure subsides, near the end of the boost phase, the high pressure gas acting on the second effective area overcomes the force of the booster pressure and moves the piston slightly to disestablish the second effective area, thereby permitting the high pressure gas to be suddenly applied to the larger first effective area. This results in a sudden step increase in force to produce an actuating stroke of sufficient magnitude to cause a rapid withdrawal of the keeper from engagement with the clamping ring.

Figure 1:
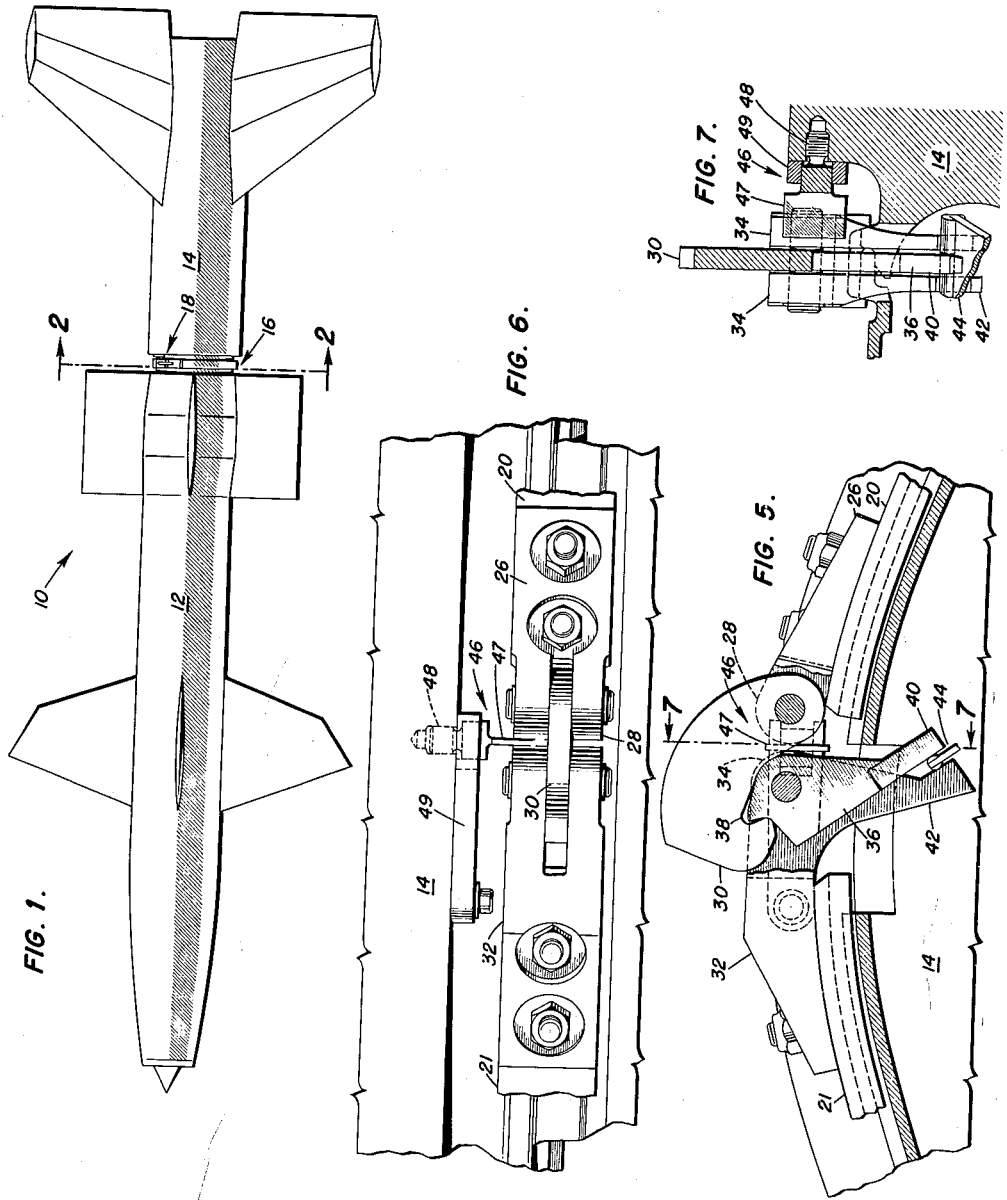
Fig. 1 is a side elevation of a missile and booster coupled in locked relationship by a clamping ring, showing the location of the pneumatic release mechanism constituting the present invention.

Referring now to the drawings in greater detail, Fig. 1 shows a missile-booster combination 10 having a missile 12 coupled to a booster 14 by a clamping ring assembly 16. A release mechanism 18 constituting the present invention is mounted between the missile 12 and the booster 14 on the forward end of the booster.

Figure 2:
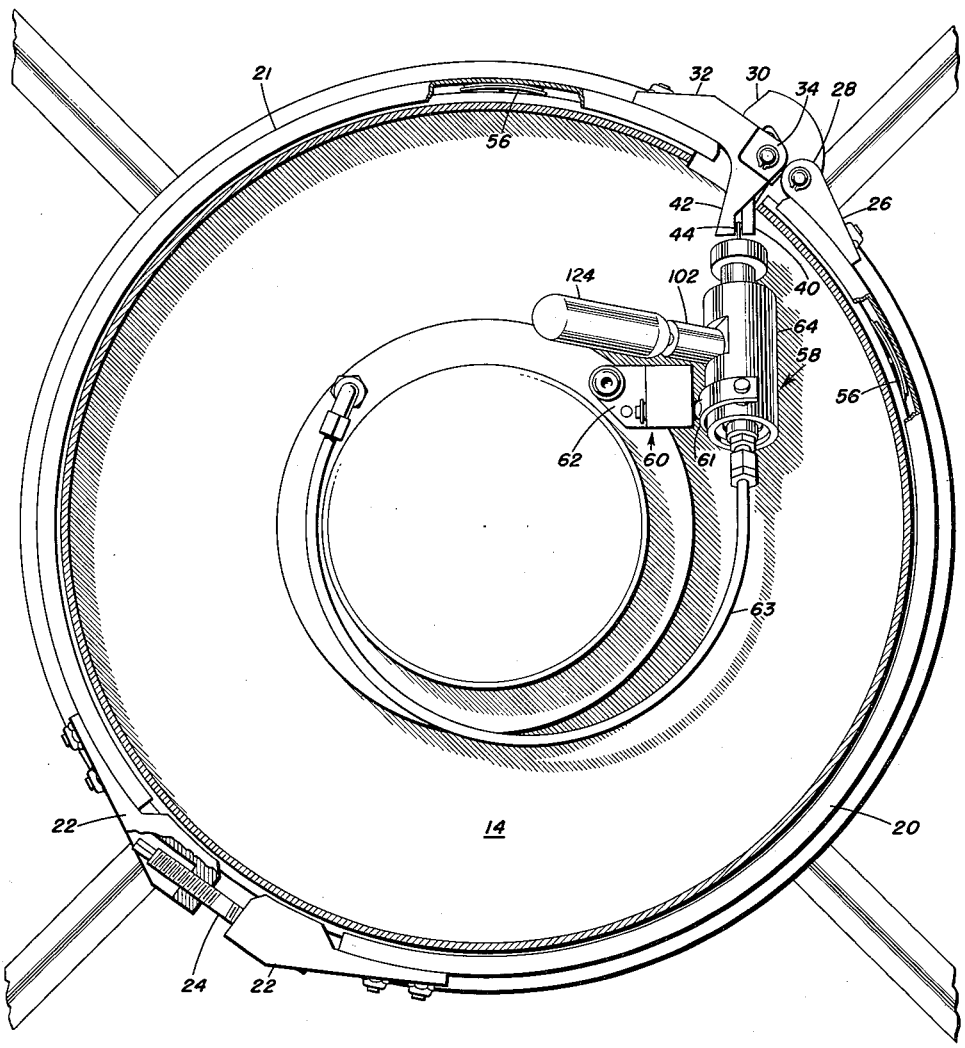
Fig. 2 is a cross section on line 2—2 of Fig. 1 showing the general arrangement of the release mechanism and details of the clamping ring.

The clamping ring assembly 16 is a modification of that disclosed in U.S. patent application No. 594,067, filed June 26, 1956, by W. H. Goss et al. for a Guided Missile, and as seen in Fig. 2, includes a pair of companion semi-circular ring sections 20 and 21 each having an internally threaded fitting 22 secured to one end thereof. Connecting the two fittings 22 together is a right and left hand screw link 24 having a hexagonal head formed on each end thereof to facilitate wrenching for adjusting purposes.

As best seen in Fig. 5, on the other end of the ring section 20 is secured a fitting 26 having a pair of apertured yokes 28 formed thereon for journalling a shaft on which is pivotally mounted a hammer 30. On the corresponding end of the other ring section 21 is secured a fitting 32 having a pair of apertured yokes 34 formed thereon for supporting a shaft on which is pivotally mounted a sear 36. A notch 38 in the hammer 30 is engageable with the sear 36 in such manner that in the position of engagement an arm 40 on the sear is disposed in proper spaced relationship with an extension 42 of the fitting 32 so that a keeper 44 inserted between the arm and the extension maintains engagement of the hammer and sear.

For the purpose of insuring positive opening of the ring sections 20 and 21, leaf springs 56 are provided on the inner surface thereof and bear against the missile-booster combination tending to force the ring sections outwardly. Holding the ring sections 20 and 21 in place against the force of the springs 56 is the aforementioned hammer and sear arrangement which releases upon withdrawal of the keeper 44.

Since, as will later be shown, the location of the hammer and sear arrangement with respect to the booster periphery is critical for the satisfactory operation of the release mechanism, a locating index 46 is provided on the booster 14 for the purpose of positioning the clamping ring assembly 16 in proper spaced relationship with the booster. As may be seen by referring to Figs. 5, 6 and 7, the index 46 includes a projecting web 47 formed on the head of a bolt 48 threadably engaged in the forward portion of the booster 14. The bolt 48 is screwed in as far as it will go and then backed off just enough to align the longitudinal axis of the web 47 radially with respect to the booster 14. In order to maintain this aligned position, a bifurcated yoke 49 pivotally secured to the booster 14 engages the bolt head and constrains the bolt 48 from further rotation.

In installing the clamping ring 16 onto the missile-booster combination 10, one or the other of fittings 26 and 32 is butted against the web 47 and the ring sections 20 and 21 drawn together by engagement of the hammer 30 and sear 36. As mentioned above, the clamped position of the ring assembly is maintained by insertion of the keeper 44 between the arm 40 and extension 42.

As may be seen in Fig. 2, the keeper 44 is coupled to a sensing and actuating cylinder assembly 58 that is universally mounted on the forward end of the booster 14 by a universal arrangement 60 including a yoke 61 and a link 62. Even though the cylinder assembly 58, and consequently the keeper 44, is thus furnished with considerable latitude of movement, it is still necessary that the keeper and the clamping ring assembly 16 be positioned in proper spaced relationship with each other. Therefore, the need for the positioning index 46 hereinbefore described becomes apparent. For purposes to be hereinafter described, a tube 63 transmits pressure from a chamber (not shown) in the booster 14 to the cylinder assembly 58.

As best seen in Fig. 3, the sensing and actuating cylinder assembly 58 includes a cylinder 64 having a piston 65 and a piston body 66 movable therein within the limits imposed by a head 67 and a collar 68. The head 67 is positioned at one end of the cylinder 64 against a washer 69 which bears on a shoulder formed in the inner surface of the cylinder. Securing the head 67 to the cylinder 64 is a retaining ring that engages a suitable recess in the inner wall of the cylinder. An appropriate groove is provided in the outer periphery of the head 67 to accommodate an O ring. For the purpose of communicating booster pressure to the cylinder 64 an aperture 70 extends through the head 67 and is threaded to receive a connector 71 which is coupled to the tube 63.

For purposes to be hereinafter explained a small longitudinal groove 64a is provided in the inner wall of the cylinder 64 between the collar 68 and the washer 69.

Closing the other end of the cylinder 64 and supporting the piston body 66 is a bearing 73. The bearing 73 is installed between a retaining ring 74 and a washer 75, the latter bearing against a sleeve 76 that abuts the collar 68. Another retaining ring 77 restrains movement of the collar 68 and appropriate recesses are provided in the collar and the bearing 73 for the accommodation of O rings.

The piston 65 is provided with first and second effective areas, the first and larger being defined by a piston ring 78 and the second and smaller by a face seal 79. The ring 78 is of conventional design; however, the face seal 79 is adapted to seal against the collar 68 and is formed of molded rubber cast into a ring 80 that is pressed onto a reduced diameter portion of the piston 65. The piston body 66 is substantially cylindrical with a tapered central portion 82 and an end portion 83 that is provided with a counterbore 84.

As can be seen in Fig. 3, when the piston 65 is in its innermost position, the end portion 83 extends beyond the bearing 73 sufficiently to accommodate a collar 85 that is secured to the end portion by radially placed screws 86. The collar 85 houses three dogs 87 that project through radial apertures in the end portion 83. As shown in Fig. 4, springs 88 secured to the collar 85 by screws, urge the dogs 87 inwardly against a shaft 89 that is slidably housed in the counterbore 84. The shaft 89 couples the keeper 44 to the cylinder assembly 58 and is provided with a reduced diameter portion 90 to form a shoulder 91. Located longitudinally on the shaft 89 are three grooves 92 that extend the full length thereof to vent the recess formed by the counterbore 84. Another groove 93 is provided longitudinally on the shaft 89 but extends only a portion of the length of the shaft 89 so that one of the screws 86 may engage the groove to prevent the shaft from being pulled out of the counterbore 84. To prevent the possibility of the shaft 89 from being pushed too far into the counterbore 84, a wire 94 is attached between the shaft and the cylinder 64.

As seen in Figs. 3 and 8, the keeper 44 comprises a flat plate 95, one end being formed with a diagonal edge 96 that is provided with rounded sections 97. These sections 97 are rounded to present minimum surface contact with the arm 40 and extension 42 when the keeper 44 is inserted therebetween. In order to keep the frictional forces within certain limits, the sections 97 are preferably made of brass or of similar material.

A receiver 102, in which a container 124 is installed, is mounted on the cylinder 64 and is provided with a threaded reduced diameter portion 104 to form a shoulder 106. The portion 104 extends through an aperture 108 in the cylinder and engages a threaded aperture 110 in the sleeve 76. A recess 112 is formed in the cylinder 64 to provide an end wall 114 against which bears the shoulder 106 of the receiver 102. For accommodating an O ring for sealing purposes, an appropriate groove is provided in the shoulder 106.

The receiver 102 is proportioned with concentric first and second bores 116 and 118, respectively, that are separated by a wall 120 having an aperture 122 extending therethrough. The first bore 116 is threaded and adapted to receive the neck of the container 124. The container 124 is charged with a high pressure gas, such as nitrogen, and a diaphragm 134 is provided in the neck for sealing purposes. A gasket is compressed between the wall 120 and the neck of the container to prevent leakage.

Slidably housed in the second bore 118 is a plunger 130 having a sharp point 132 adapted to extend through the aperture 122 and puncture the diaphragm 134 in the container 124. The plunger 130 is provided with a body 136 that is fluted to permit the passage of gas thereby. Lateral notches 138 are formed in the body 136 and are engageable with a wire lock spring 140 housed in a recess 142 in the wall of the bore 118. The recess 142 and the notches 138 are disposed in proper relationship with one another so that when the point 132 of the plunger 130 is in a position that has caused puncture of the seal 134, the spring 140 will engage the notches.

For the purpose of providing a means for the plunger 130 to be urged into a diaphragm puncturing position, a follower 144 is provided at the lower end of the body 136. The follower 144 engages and rides upon the tapered central portion 82 of the piston body 66. In Fig. 3 it is seen that when the follower 144 is in engagement with the smallest diameter of the tapered portion 82, the plunger 130 is at the bottom of its stroke. As the piston body 66 moves to the left, the follower 144 rides up the tapered portion 82 and urges the plunger 130 upwardly until the point 132 punctures the seal 134. At this point, as previously mentioned, the spring 140 in the receiver 102 engages the notches 138 to lock the plunger in its uppermost position.

In discussing the operation of the present invention, it will be assumed that the clamping ring assembly 16 is in place on the missile-booster combination 10 as shown in Fig. 2, and that it is maintained in a clamped position by the presence of the keeper 44 inserted between the arm 40 and extension 42.

As previously mentioned, the tube 63 transmits booster pressure from a chamber (not shown) of the booster 14 to the sensing and actuating cylinder assembly 58. Upon ignition of the booster 14, the booster pressure within the chamber, as can be seen by referring to Fig. 3, is introduced into the cylinder 64 to urge the piston 65 to the left. As the booster pressure increases, the continued movement of the piston 65 to the left causes the tapered central portion 82 to move the plunger 130 upwardly so that the point 132 punctures the diaphragm 134 to release the high pressure gas in the container 124. With the plunger 130 in this position, the spring 140 engages the notches 138 to lock the plunger in place.

Simultaneously while the piston body 66 is moving to the left, there is a change of relative position between the keeper shaft 89 and the bore 84 of the piston body, since the keeper 44 is restrained from movement to the left by reason of its engagement with the arm 40 and extension 42. As this change in relative position increases, the spring loaded dogs 87 in the collar 85, which up to this moment have been in engagement with the shaft 89, drop down over the shoulder 91 to engage the reduced diameter portion 90 of the shaft thereby coupling the keeper 44 to the piston body 66. A slight overtravel of the piston body 66 to the left is then permitted until the face seal 79 engages the collar 68 to prevent further movement of the piston body.

While the piston is thus over in the extreme left position, the following temporary static conditions exist: the booster pressure is of sufficient magnitude to maintain the piston in this position by acting on an area equal to that enclosed by the face seal 79; the presence of the groove 64a in the inner wall of the cylinder 65 permits the pressure on the left side of the piston ring 78 outside of the face seal 79 to equalize gradually with that on the right side; and the recently released high pressure gas acting on the annular area outlined by the diameters of the face seal 79 and the piston body 66, creates a lesser force tending to urge the piston to the right.

These static conditions exist until the booster pressure subsides, indicating the nearing of the end of boost phase. At this time, when the transmitted booster pressure on the left side of the face seal 79 falls to a predetermined value, the force created by the high pressure gas acting on the annular area within the face seal is of sufficient magnitude to actually move the piston to the right. As previously described, a small amount of overtravel was furnished the piston body so that the dogs 87 would ride freely on the reduced diameter portion 90 of the keeper shaft 89 before they would bear against the shoulder 91. During this free travel the seal effected by the face seal 79 is broken, thus permitting the high pressure gas to be suddenly applied to the entire effective piston area within the piston ring 78. This produces a step increase in the force to the right so that the piston body 66, coupled to the keeper 44 by engagement of the dogs 87 against the shoulder 91, rapidly withdraws the keeper from between the arm 40 and the extension 42 to result in release of the clamping ring assembly 16.

Obviously many modifications and variations of the present invention are possible in the light of the above teachings. It is therefore to be understood that within the scope of the appended claims, the invention may be practiced otherwise than as specifically described.

What is claimed is:

1. In combination with a missile and a booster and a releasable clamping ring for coupling the booster to the missile, a mechanism for effecting in-flight release of the clamping ring, comprising, restraining means including a keeper engageable with and constraining release of the clamping ring, actuating means including a cylinder having a source of high pressure gas coupled thereto, said actuating means being engageable with said restraining means and responsive to pressure within said booster to couple said actuating means and restraining means in locked relationship and to release said source of gas into said cylinder, said actuating means also being actuable by said high pressure gas at a predetermined value of said booster pressure to rapidly disengage said restraining means from the clamping ring, thereby effecting in-flight release of said clamping ring.

2. In combination with a missile and a booster and a releasable clamping ring for coupling said missile and booster in tandem relationship, a release mechanism for effecting in-flight release of said clamping ring, comprising, a keeper engageable with said clamping ring to restrain release thereof, a sensing and actuating assembly on said booster and including a cylinder, a piston in said cylinder, and coupling means on said piston and operable to engage said piston and keeper in locked relationship, first pressure responsive means in said assembly and responsive to pressure in said booster for moving said piston in an arming stroke, said arming stroke causing operation of said coupling means to engage said piston in locked relationship with said keeper, and second pressure responsive means in said assembly and responsive to subsidence of said booster pressure to a predetermined value for moving said piston in an actuating stroke, said actuating stroke causing said piston to withdraw said keeper from engagement with said clamping ring.

3. The apparatus as recited in claim 2, wherein said cylinder includes additionally a collar fixedly mounted therein, and said piston includes a first sealing means engageable with said cylinder to establish a first effective piston area, and a second sealing means on said piston and engageable with said collar to establish a smaller and second effective piston area, said second sealing means and collar being in engagement only when said piston is at the end of said arming stroke.

4. The apparatus as recited in claim 3, wherein said first pressure responsive means includes means for introducing said booster pressure into said cylinder to act on said first effective piston area, and said second pressure responsive means includes a source of high pressure gas, and means for releasing said gas into said cylinder on the side of the piston opposite to that on which said booster pressure acts, said means being proportioned to cause said high pressure gas to act initially on said second effective piston area.

5. The apparatus as recited in claim 4, wherein said last mentioned means is operable by the movement of said piston into the last portion of said arming stroke.

6. The apparatus as recited in claim 4, wherein said last mentioned means includes sealing means for preventing flow of said high pressure gas into said cylinder, and a plunger slidably housed in said sensing and actuating assembly and engageable with said sealing means to render said sealing means ineffective, said plunger being urged into engagement with said sealing means by said piston as said piston terminates said arming stroke.

7. In combination with a missile and a booster and a releasable clamping ring coupling said missile and booster in tandem relationship, a release mechanism for effecting in-flight release of said clamping ring, comprising, a keeper engageable with said clamping ring to restrain release of said clamping ring, a sensing and actuating assembly mounted on the booster and including a cylinder, means for transmitting pressure from said booster to said cylinder, a differential piston in said cylinder, said piston having sealing means thereon for engagement with said cylinder to define a first effective area, a collar fixedly mounted in said cylinder, said piston having a second sealing means thereon for engagement with said collar to define a second and smaller effective area, said piston being engageable with said collar only when said piston is at the end of an arming stroke, said arming stroke being in response to said transmitted booster pressure acting on said first effective area, said piston being slidably engageable with said keeper and having means thereon for coupling said piston and keeper in locked relationship, said coupling means being operable at the end of said arming stroke, a source of high pressure gas, means in said assembly for releasing said gas into said cylinder on the side of the piston opposite to that on which said booster pressure acts, said releasing means being actuable at the end of said arming stroke to release said gas against said second effective area, and means in said assembly for permitting gradual equalization of booster chamber pressure on opposite sides of said first effective area, whereby, as said booster reaches the end of its boost phase and said booster pressure diminishes, said high pressure gas acting on said second effective area will move said piston in a preliminary actuation stroke to disestablish said second effective area, thereby suddenly exposing said first effective area to said high pressure gas to provide a sudden step increase in force to withdraw said keeper from engagement with said clamping ring.

8. In combination with a missile and a booster and a releasable clamping ring coupling said missile and booster in tandem relationship, a release mechanism for effecting in-flight release of said clamping ring, comprising, a keeper engageable with said clamping ring to restrain release of said clamping ring, a sensing and actuating assembly mounted on the booster and including a cylinder, said cylinder being adapted at one end thereof to receive pressure from said booster, means for transmitting booster pressure from said booster to said cylinder, a first and second limiting means in said cylinder, a piston in said cylinder and movable within said first and second limiting means, said piston having structure engageable with the inner wall of said cylinder to define a first effective area and being responsive to said booster pressure acting on said first effective area to move from said first limiting means to said second limiting means, said piston being slidably engageable with said keeper and having clutching means thereon for effecting a locked relationship with said keeper, said locked relationship including a small amount of free travel between said keeper and piston, said clutching means being operable upon response of said piston to said booster pressure, second structure on said piston and engageable with said second limiting means to define a second effective area, a small groove in the inner wall of said cylinder and extending between said first and second limiting means for permitting gradual equalization of pressure on the opposite sides of said first effective area when said piston is against said second limiting means, a source of high pressure gas in said sensing and actuating assembly and communicable with said first and second effective areas in said cylinder, sealing means in said assembly for preventing the flow of said high pressure gas into said cylinder, and puncturing means in said assembly for rendering said sealing means ineffective to permit said high pressure gas to act initially on said second effective area, said puncturing means being operable by the final movement of said piston toward said second limiting means, whereby, upon launching of said missile and booster, pressure from said booster acts on said first effective area to move said piston from said first limiting means to said second limiting means, thereby establishing said second effective area, said movement of said piston also causing said piston to be engaged in said locked relationship with said keeper, said movement also causing release of said high pressure gas into said cylinder to act on said second effective area, so that when said booster pressure subsides to a predetermined value, indicating the end of the boost phase, said high pressure gas overcomes the force of said booster pressure to move said piston slightly away from said second limiting means in an amount allowed by said free travel to disestablish said second effective area, whereupon, said high pressure gas is suddenly applied to said first effective area to provide a sudden step increase in force, thereby moving said piston rapidly towards said first limiting means to cause a sudden withdrawal of said keeper from engagement with said clamping ring.

References Cited in the file of this patent
UNITED STATES PATENTS
2,833,494     Parker et al. _____ May 6, 1958